Patented Sept. 3, 1940

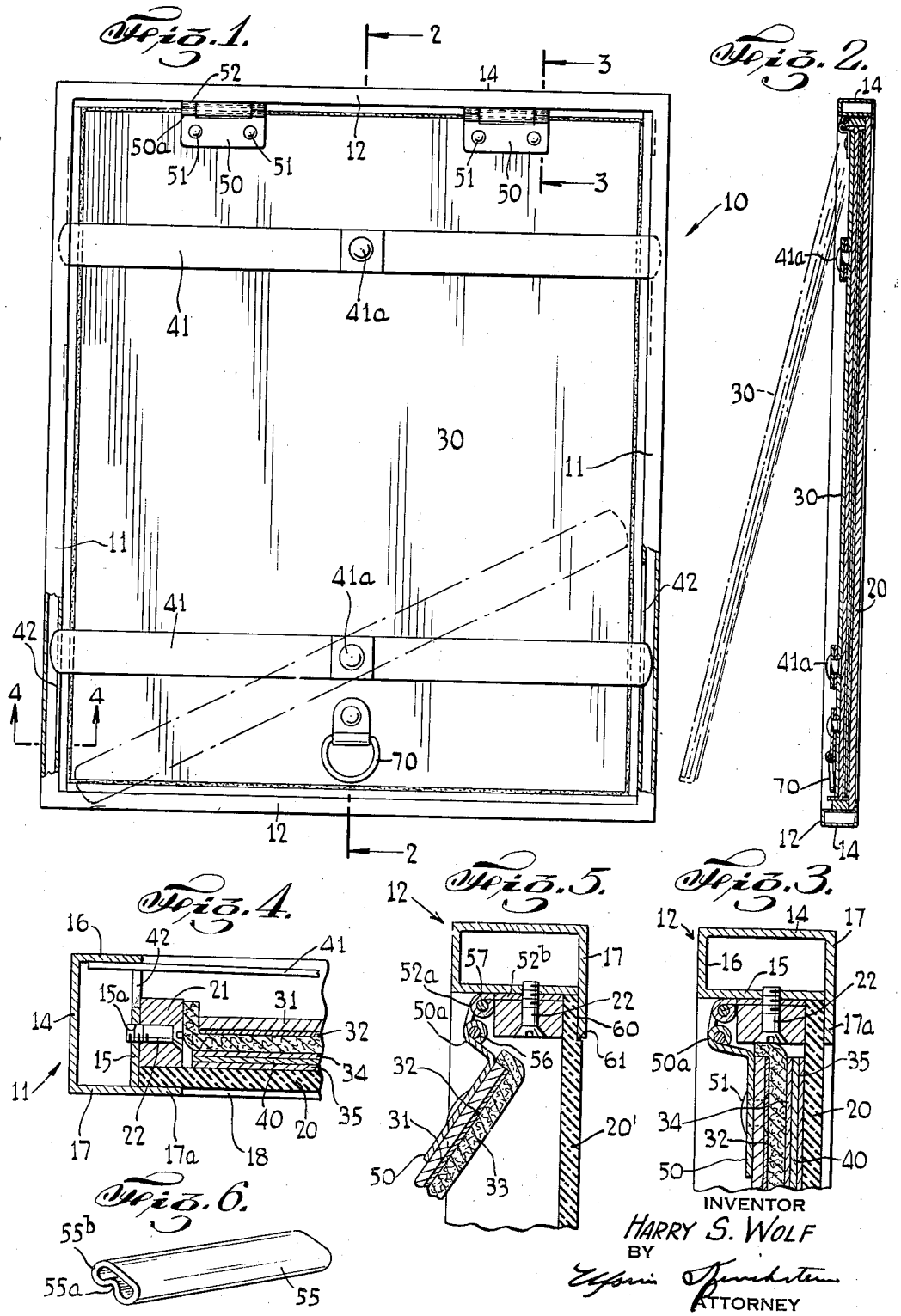

2,213,437

UNITED STATES PATENT OFFICE 2,213,437

X-RAY CASSETTE

Harry S. Wolf, Brooklyn, N. Y.

Application September 15, 1938, Serial No. 230,017

3 Claims. (Cl. 250—68)

This invention relates generally to printing frames. More particularly, my invention relates to the type of printing frames or cassettes employed for holding X-ray films during exposure.

One of the objects of my invention is to provide an X-ray cassette of the character described having an improved frame construction for mounting a composition plate.

Another object of my invention is to provide in an X-ray cassette of the character described improved means for mounting a cassette cover.

Still another object of my invention is to produce an X-ray cassette construction characterized by its simplicity and economy in manufacture and material; by its ruggedness of construction, and which, at the same time, is highly efficient for the purposes intended.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a rear elevational view of an X-ray cassette constructed in accordance with my invention and having portions of the frame broken away to disclose the interior construction thereof;

Fig. 2 is a cross-sectional view taken substantially on the line 2—2 of Fig. 1;

Fig. 3 is an enlarged cross-sectional view taken substantially on the line 3—3 of Fig. 1;

Fig. 4 is an enlarged cross-sectional view taken substantially on the line 4—4 of Fig. 1;

Fig. 5 is a view similar to Fig. 3 but illustrating a modified form of my invention; and Fig. 6 is an enlarged perspective view of a detail of the cassette cover mounting.

Referring now in detail to the drawing, I have shown an X-ray cassette constructed in accordance with my invention and comprising a hollow rectangular frame 10, which is preferably constructed of a pair of side sections 11 and a pair of end sections 12 suitably joined, such as by welding. Each of the pairs of sections 11 and 12 are preferably formed from a single sheet of metallic material which is angularly bent so as to form a hollow tubular member of substantially rectangular cross-sectional contour having an outer side wall 14, an inner side wall 15, a back wall 16 and a front wall 17. The front wall 17 is provided with an integral flange portion 17a in the same plane as the wall 17 but which extends beyond the wall 15 for a predetermined distance.

The flanges 17a of the pairs of sections 11 and 12 define an inner frame opening 18.

Mounted within the frame 10 so as to cover the opening 18 is a plate 20, the material of such plate being of any suitable composition known in the X-ray cassette art, such as for example, a Bakelite sheet. The plate 20 is adapted to rest upon the flange portions 17a of the frame walls 17 and to have the edges thereof disposed closely adjacent the inner walls 15. The plate 20 may be cut to any predetermined size to allow sufficient clearance between the edges thereof and the walls 15 to facilitate the mounting and withdrawal thereof. To retain the plate 20 in proper position in the frame, there is provided molding strips 21 which may be of any suitable material such as metallic rod members of rectangular cross-sectional contour, the said rods being attached to the four inner side walls 15 by any suitable attaching means, such as for example, the screws 22 passing through correspondingly threaded openings in the molding strips 21 and specially provided threaded openings 15a in the walls 15. The screws 22 are preferably countersunk within the molding strips 21, so as not to obstruct the movement of a cassette cover.

It is thus seen from the above described construction that I have provided an X-ray cassette in which the frame sections thereof are of one-piece construction, thereby adding strength to the frame. At the same time, due to the hollow construction of the pairs of sections 11 and 12 as above described, there is provided a frame, light in weight, which is highly essential in X-ray work. It is also noted that the integral lip or flange 17a of each of the frame sections provides an easy method for the mounting and withdrawing of the Bakelite sheet 20 while at the same time serves as a neat-appearing finishing frame for the said sheet 20.

A cover 30 of usual construction and design is provided for the X-ray cassette, such cover comprising a backing sheet 31 of aluminum or steel or any other suitable material. The backing sheet 31 is covered with a layer 32 of tin foil designed to absorb secondary rays, and the sheet 32 is then covered with a layer 33 of resilient material, such as for example, felt having a resilient quality, to provide a positive and uniform contact between the cover and the intensifying screens and film interposed between the said cover and the inner surface of the composition sheet 30. As is customarily known in the art, one intensifying screen 34 is fixed to the felt layer 33 by any suitable means such as glue, while the other intensifying screen 35 is similarly fixed to the inside surface of the Bakelite sheet 20. In actual operation, the film or negative 40 is interposed between the two intensifying screens 34 and 35 as in Figs. 2, 3 and 4. A pair of resilient spring members 41 of any desired construction known to the art are rotatably mounted on the backing sheet 31. Portions of said members 41 on opposite sides of the pivot 41a are angularly bent upwardly to provide resilient frictional contact with cooperating pairs of slots 42 provided in the inner walls 15 as shown.

In X-ray cassette constructions of the character described herein, it is of extreme importance that the film 40 be so mounted that it will not be moved from position during the taking of X-ray photographs since any such movement would distort the image on the film and make interpretation thereof difficult. By my invention I have provided a mounting construction for the cover 30 which is so designed as to prevent lateral movement thereof and at the same time is so arranged that all the portions of the area of the felt layer 33 will uniformly press against the Bakelite sheet 20 regardless of the size and positioning of the film 40.

Referring now to Figs. 1, 3, 5 and 6 of the drawing, I have shown a novel hinge mounting for the cover 30 which will now be described. A pair of hinge members 50 are fixed to the backing sheet 31 adjacent one end edge thereof as shown and suitably spaced laterally from each other. The members 50 may be attached to the backing plate 31 by any suitable attaching means such as the rivets 51. The members 50 are also provided adjacent opposite ends thereof with integral upwardly extending ears 50a, the said ears being provided with loop portions at the upper end thereof, as clearly shown in Figs. 3 and 5. For cooperation with the ears 50a of the members 50, there is provided corresponding sets of spaced ears 52, fixed to the frame section 12 and designed to be adjacently disposed with respect to the ears 50a. The ears 52 are also provided with looped portions 52a and straight body portions 52b. The body portions 52b are adapted to lie flush up against the surface of the frame wall 15 and to be permanently attached thereto by means of the screws 22 employed for attaching the molding strip 21 to the said wall 15 of the frame section 12. The screws 22 pass through correspondingly threaded holes in the portions 52b. Portions of the molding strip 21, disposed adjacent the frame section 12, may be provided with notched recesses adapted to receive the portions 52b therein so that the said molding strip 21 may lie flush up against the wall 15. Interposed in the space defined between each of the adjacently disposed pairs of ears 50a and 52a is a tubular member 55 which may be constructed, as shown in Fig. 6, by flattening a tube of circular cross section and then providing a pinched portion 55a in one flat surface thereof and longitudinally disposed with respect to the member 55. This pinched portion defines two substantially parallel channels 55b. The channels 55b are designed to be aligned with the openings in the loops of the ears 50a and 52a. The members 55 are then held in position between the looped portions 50a and 52a by inserting rigid rod members 56 and 57 through loops of the portions 50a and 52a and passing through the channels 55b. The rods 56 and 57 are designed to fit so as to permit pivotal movement of the members 50 and 52 thereabout.

It is thus seen from the above described construction that the cover member may pivotally adjust itself on either or both of the pivot rods 56 and 57, so as to always contactively engage the intensifying screen 34 in a substantially uniform manner regardless of the thickness of the film 40. Also by the above described construction the cover member 30 will be prevented from lateral displacement so that once the negative 40 is properly positioned, there will be no displacement thereof due to lateral movement of the cover. It is also seen by the above construction that the cover 30 may be pivotally swung to an open position so as to lie substantially at an angle of 180° to its effective closed position.

A bail member 70 may be suitably fixed to the cover 30 to facilitate the pivotal movement thereof.

In Fig. 5 of the drawing I have shown a modified construction of my X-ray cassette in which the composition plate 20' is provided with a marginal recess 60, defining a shoulder 61 which is designed to abut the free edge of the flange portion 17a. By this type of construction a better light and dust seal is provided between the composition plate 20' and the frame. Also, the appearance of the cassette is enhanced.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. For use with a cassette having a frame, a composition plate in said frame and a cover overlying said plate—hinging means for attaching said cover to said frame, said hinging means comprising a hinge member having a flat portion thereof fixed to said cover and a pair of integral upwardly extending ears or lugs spaced from each other, said pair of lugs being provided with aligned openings, a second hinge comprising a flat portion fixed to said frame and having integral upwardly extending ears or lugs provided with aligned openings, the lugs of said second hinge member being correspondingly and adjacently disposed with respect to said first named hinge member lugs, a third member, said third member having an opening therein in alignment with the aligned lug openings of said first hinge member and also with the openings in the lugs of said second hinge member, and a rod or shaft passing through each corresponding pair of aligned lug openings and through said third member opening.

2. An X-ray cassette comprising a frame substantially of rectangular shape having a back opening and a front opening smaller than said back opening, said frame comprising one-piece tubular members having inwardly extending integral flanges defining said front opening, a removable composition plate resting on said flanges and closing off said front opening, and detachable strips for retaining said plate in said frame, whereby upon removal of said strips, the said plate may be removed through said back opening.

3. An X-ray cassette as set forth in claim 2 wherein said strips are removably secured to the side wall of said tubular members.

HARRY S. WOLF.